Nov. 5, 1963     C. S. HELLMANN     3,109,948
MOTOR WINDING CONTROL AND MEANS THEREFOR
Filed July 24, 1959
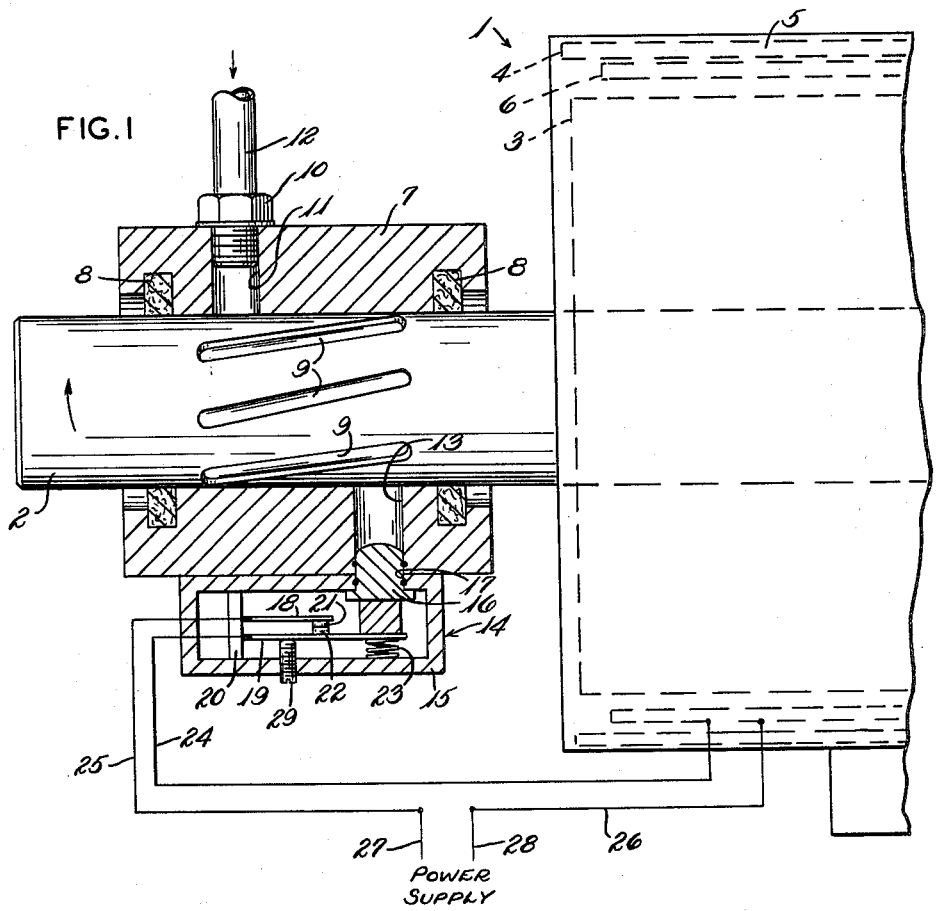
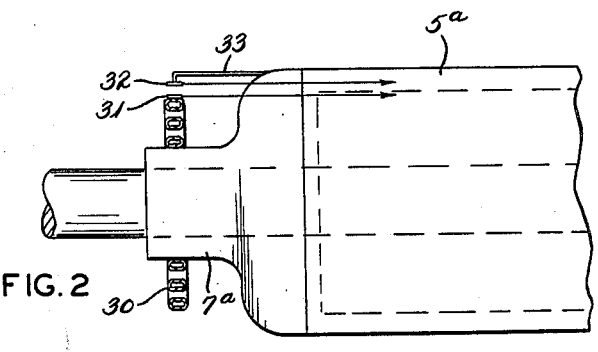
INVENTOR.
CARL S. HELLMANN
BY Oldham & Oldham
ATTYS.

United States Patent Office 3,109,948
Patented Nov. 5, 1963

3,109,948
MOTOR WINDING CONTROL AND
MEANS THEREFOR
Carl S. Hellmann, Akron, Ohio
(3809 Jocelyn St. NW., Washington 15, D.C.)
Filed July 24, 1959, Ser. No. 829,438
6 Claims. (Cl. 310—68)

The present invention relates to motor winding controls and means performing such controls, and especially to apparatus for controlling the energization circuit of a starting winding of a fractional horse power induction motor, or the like by means responsive to the speed of the motor.

When small motors are started, which motors have both a main or operating winding therein and an auxiliary or starting winding, the auxiliary winding must be selected, energized, sensed, and deenergized after the motor achieves a predetermined percentage of its normal operating speed. Motors have been provided with various types of controls so that the starting winding of the motor is released or cut out at approximately ¾ of the rate of speed, or other desired proportional speed of the motor which will then bring itself up to full rated speed by the main winding of the motor.

These prior controls, insofar as I am aware, have not been completely satisfactory in that they have not provided readily adjustable means for selecting the starting winding release speed, nor are they readily adjustable as to the reenergization speed of the motor under speed decreasing conditions at which time the starting winding would again be energized for improving the load carrying characteristics and operational speed of the motor.

Furthermore, none of these prior constructions have been of uncomplicated, easily controlled and low-maintained construction.

The general object of the present invention is to provide a novel and improved motor winding control, and apparatus for performing such control, characterized by the provision of a pump unit integral with the shaft of the motor whose winding circuit is being controlled.

Another object of the invention is to provide a control for the starting winding of an electrical motor wherein the speed at which such winding is released or cut out from the motor circuit, and the speed at which such winding is reengaged or reenergized in relation to the motor speed are readily controllable.

Yet another object of the invention is to provide a low cost motor control assembly of the type described and which control means and apparatus has no appreciable wear problems even after continued use and which control is noiseless in operation and is made from a relatively few parts.

A further object of the invention is to provide an exact or precise adjustment means whereby motor winding circuits can be controlled to cut in or out at predetermined motor speeds, and wherein the motor control means are substantially insensitive to changes in the line voltage supplied to the motor.

The foregoing and other objects and advantages of the invention will be made more apparent as this specification proceeds.

For a better understanding of the invention, reference is directed to the accompanying drawing in which:

FIG. 1 shows one currently preferred embodiment of the invention in association with a motor and a simple control circuit therefor; and FIG. 2 is a fragmentary elevation of a modification of the invention.

When referring to corresponding members shown in the drawings and referred to in this specification, corresponding numerals are used to facilitate comparison therebetween.

In general, the present invention relates to apparatus and means for controlling a motor winding energization circuit and the apparatus relates to the combination of an electric motor having a main winding, an auxiliary winding and a motor shaft with a sleeve that receives a portion of the motor shaft therein, means carried by the sleeve and forming a pump chamber around a section of a shaft, and pump vane means formed on a section of the shaft in the pump chamber to provide a pump having outlet pressures proportional to the speed of the motor. The sleeve has a bore therein for connecting a fluid supply, either liquid or aeriform, to the pump chamber, and a pump outlet means is provided and connects to the pump chamber and the sleeve to transmit fluid under pump outlet pressure therefrom whereby such fluid can be transmitted to a member, such as a pressure actuated switch, to control energization of the auxiliary motor winding dependent upon the speed of operation by the motor as reflected by the outlet pressure of the pump.

Attention now is particularly directed to the details of the structure shown in the accompanying drawings, and an electric motor, usually, but not necessarily restricted to, a small, or fractional horse power induction motor, is indicated as a whole by the numeral 1. This motor 1 has a motor shaft 2 extending therefrom, and an armature 3 is carried by the motor shaft 2. The drawings show an auxiliary, or starting winding 4 provided in a portion of the stator, or housing 5 of the motor 1 while a main winding or principal operating winding 6 is also shown mounted on the stator 5.

The present invention, as an element thereof, provides a pump which is built into and formed as a part of the operative assembly of the motor 1, and such development particularly relates to a novel and improved control for the energization or function of the auxiliary winding 4 of the motor 1. Hence a sleeve 7, or other suitable bearing, or enclosure member is positioned around a portion of the protruding section of the motor shaft 2 and some known type of seal means, such as a pair of felt seal rings 8, 8 are carried by axially spaced portions of the sleeve 7 to provide with the shaft 2, as hereinafter described, a pump unit and pump chamber in which the motor shaft 2 is positioned. The shaft 2 is provided with fluid impeller means thereon, or has other suitable fluid impeller means provided thereon, such as diagonally extending, circumferentially spaced vanes, serrations or slots 9 formed in or on the periphery of the motor shaft 2 in the section thereof enclosed by the sleeve 7.

Any conventional means, such as an inlet fitting 10, connects to a bore 11 provided in the sleeve 7 and connecting to the pump chamber formed therein so that a member, such as a conduit 12, can connect to the fitting 10 and extend to a source of input fluid that would be continually supplied to the bore 11 for pump action to be exerted thereon within the sleeve 7. The direction of inclination and shape of the serrations 9, or equivalent means, in the pump in relation to the direction of rotation is such that fluid received in such serrations 9 from the bore 11 is urged by the rotational action of the motor/pump shaft 2 towards an outlet bore 13 provided in the sleeve 7. Thus any desired member, such as a fitting or outlet tube, or Bourdon tube, or bellows can be connected to the bore 13 for transmitting the outlet pressure fluid, and the outlet pressure exerted thereon, to a control member, as hereinafter described.

In one embodiment of the invention shown herein, a pressure actuated switch 14 is indicated as a whole by the numeral 14. The switch 14 includes a frame 15 that is secured in a conventional manner by cap screws (not shown) or the like to a portion of the sleeve 7. A control piston 16 is slidably received in a hole or aperture 17 formed in a portion of the hollow center frame 15 for reciprocating movement with relation thereto and normally a portion of the piston 16 protrudes from the switch 14 and is received in the outlet bore 13. Two spring contact arms 18 and 19 are secured in insulated relation to each other within the frame 15, as by being carried by a positioning plate 20. These arms 18 and 19 each carry contacts 21 and 22, respectively, thereon and with such spring arms being urged together by a control spring 23 engaging the spring arm 19 to urge it towards the spring arm 18. Leads 24 and 25 are conventionally connected to the spring arms 18 and 19 and extend therefrom with one lead 24 connecting to the auxiliary winding 4 and with another lead 26 extending back from the auxiliary winding 4 so that the leads 25 and 26 can connect to power supply leads 27 and 28. Hence when the switch 14 is closed, the auxiliary winding 4 is energized. However, when sufficient pressure is exerted on the piston 16 to open the electrical circuit formed between the spring arms 18 and 19, then the auxiliary winding 4 is not energized and the motor 1 will operate with only the main winding 5 thereof energized in a conventional manner.

It will be seen that the pump provided by the vanes or serrations 9 within the sleeve 7 will rotate at the motor speed and will have an output pressure proportional to the speed of rotation of the motor 1. From the foregoing, it should be realized that the motor winding control of the invention will function automatically to cut out the auxiliary winding 4 when a predetermined speed in the motor is reached. Likewise, should the speed of the motor 1 fall below this preselected speed at any time, the auxiliary or starting winding 4 will automatically cut back into energization and aid in building up the motor 1 to the desired speed.

Adjustment action for the opening pressure is provided by means, such as a set screw 29, that engages the frame 15 of the switch 14 and exterts a back-up pressure on the spring arm 19 to move it closer towards the spring arm 18, or to make it more difficult for the piston 16 to move the spring arm 19 away from the other spring arm for opening the energization circuit controlled by the means of the invention.

If desired, the switch 14 can control a relay or other actuation means to open or close an energization circuit for the auxiliary winding, and any other conventional control means such as a starting switch or circuit may be provided in the circuit of the switch 14. Any desired bearing, as required, may be present in the motor 1, or its positioning means, for the shaft 2, or the sleeve 7 may be utilized as a bearing and can be an integral part of the motor housing 5.

It is possible in the invention to use other known forms of seals for forming the pump chamber means and a laminated air seal, for example, can be used. In such a seal, the seal function is obtained across several grooves in the sleeve or enclosure construction to break the pressure differential between the pump and atmosphere into several pressure gradients at very narrow radial openings at the margins of the grooves and provide a low friction, high temperature effective seal and bearing action in the unit.

In the modification of the invention shown in FIG. 2, a motor stator 5a is shown that has an integrally formed bearing sleeve 7a formed as part of the housing or stator. In this instance, a Bourdon tube 30 is provided, which tube is arranged in a spiral, concentric helix about the pump sleeve 7a and with one end of such tube 30 extending into and being secured in an outlet bore in the pump sleeve such as the bore 13 shown in FIG. 1. With changes in pressures applied to the liquid received within the Bourdon tube, it will expand in a radial direction, or contract depending upon the pressures exerted thereon. A suitable contact button 31 is provided on the end of this tube 30 and it is adapted to engage a relatively elongate arcuate contact 32 suitably secured to the housing 5a, as by means of a bracket 33, adjacent the contact button 31. Thus conventional leads can connect to the windings in the housing 5a and extend therefrom for desired circuit control action depending upon the closing of contacts 32 and 33, which would be included in the control circuit. As previously indicated, a bellows attachment, or equivalent means, could be provided for having a pressure sensitive contact medium in the apparatus of the invention to provide the desired circuit control action when predetermined operating conditions are established in the motor or other apparatus with which the control of the invention is associated. It is seen that only one moving part i.e. the Bourdon tube is provided in this modified structure of the invention. An adjustment screw, spring, or the like (not shown) may be operatively associated with the Bourdon tube 30 to adjust the forces existing thereon and control the contact closing action thereof by varying the amount of fluid pressure required for contact closing action.

In place of the inclined grooves or vanes provided on the shaft 2 in the pump portion thereof, the shaft 2 may have a helical groove, or vane with a part of one, or one or more convolutions in it that connects the inlet bore 11 to the outlet bore 13 for the desired sensing action. In some instances it may be desirable to have some of the slots or vanes 9 of FIG. 1 at different angles than the others, even including an interconnecting slot, or vane.

The apparatus shown in FIG. 2, such as the Bourdon tube 30 and associated means, may be received in the pump sleeve 7a or housing 5a for the motor, and all members may be of integral construction, as desired.

Any conventional conduits and control valves (not shown) may connect the outlet bore 13 to the liquid supply system connecting to inlet bore 11 to permit pumping of controlled quantities of liquid, as desired.

It will be seen that the liquid used in the pump of the invention can be oil, or other lubricating fluid or air, or any other lubricating fluid combination, to aid in providing quiet pump operation and to aid in journalling the motor shaft in the sleeve so that the control means can have a long, effective service life with a minimum of maintenance. The control means will function automatically and are quiet in operation so that an exact or precise speed control can be provided on the motor and with the auxiliary winding energized or deenergized at an exact preselected speed. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In combination, an electric motor having a main winding, an auxiliary winding and a motor shaft; a sleeve receiving a portion of said motor shaft therein, means carried by said sleeve and forming a pump chamber around a section of said shaft, pump vane means formed on the said section of said shaft in said pump chamber to form a pump having outlet pressures proportional to the speed of said motor, means connecting to said sleeve and said pump chamber to supply fluid thereto, and pump outlet means connecting to said pump chamber and said sleeve for transmitting fluid under pump outlet pressure therefrom whereby it can be transmitted to a pressure actuated switch for controlling energization of said auxiliary winding dependent upon the speed of operation of said motor.

2. In combination, an electric motor having a main winding, an auxiliary winding and a motor shaft; a sleeve receiving a portion of said motor shaft therein, seal means engaging longitudinally spaced portions of said sleeve and said shaft and forming a pump chamber around a section of said shaft, pump vane means formed on the said section of said shaft in said pump chamber to form a pump having outlet pressures proportional to the speed of said motor, means extending through said sleeve and connecting to said pump chamber to supply fluid thereto, and pump outlet means connected to said pump chamber for transmitting fluid under pump outlet pressure therefrom to a control member to vary energization of said auxiliary winding dependent upon the speed of operation of said motor.

3. In a control for the circuit of an electric motor having a starting winding, a main winding, and a motor shaft extending from the motor, the combination comprising a sleeve engaging said motor shaft, pump serrations formed in said shaft in the portion received in said sleeve, means connected to said sleeve to supply fluid thereto, said sleeve having a bore therein connecting said fluid supply to the serrated portion of said shaft, means sealing fluid in the section of said sleeve having said pump serrations therein to provide a pump and pump chamber in said sleeve, said sleeve having an outlet bore therein connecting to said pump chamber to receive fluid therefrom under pump outlet pressure, a pressure controlled switch connected to said outlet bore for control by the pressure exerted on fluid therein, and circuit means connecting said starting winding of the motor to said switch to cut power from said starting winding above preselected pressure exerted on said switch, which pressure is proportional to the speed of the motor.

4. In a control for the circuit of an electric motor having a starting winding, a main winding, and a motor shaft extending from the motor, the combination of a sleeve engaging said motor shaft, pump vane means operatively associated with said shaft in the portion received in said sleeve, said sleeve having a bore therein adapted to be connected to a fluid supply to provide fluid to the serrated portion of said shaft, means sealing fluid in the section of said sleeve having said pump vane means thereon to provide a pump and pump chamber in said sleeve, said sleeve having an outlet bore therein connecting to said pump chamber to receive fluid therefrom under pump outlet pressure, an adjustable pressure controlled switch connected to said outlet bore for control by the pressure exerted on fluid therein, and circuit means connecting said starting winding of the motor to said switch to remove energization from said starting winding above a preselected pressure exerted on said switch.

5. In combination, an electric motor having a main winding, an auxiliary winding and a motor shaft; an enclosure receiving a portion of said motor shaft therein, means carried by said enclosure and forming a pump chamber around a section of said shaft, pump vane means formed on the said section of said shaft in said enclosure to form a pump having outlet pressures proportional to the speed of said motor, said enclosure having means connecting to said pump chamber to supply fluid thereto, pump outlet means operatively associated with said enclosure and connecting to said pump chamber for transmitting fluid under pump outlet pressure therefrom, and a pressure actuated switch connected to said outlet means for controlling energization of said auxiliary winding dependent upon the speed of operation of said motor.

6. In combination, an electric motor having a housing, a main winding, an auxiliary winding and a motor shaft; an enclosure formed integrally with said housing and receiving a portion of said motor shaft therein, means associated operatively with said enclosure and forming a pump chamber around a section of said shaft, pump vane means formed on the said section of said shaft in said enclosure to form a pump having outlet pressures proportional to the speed of said motor, said enclosure having means connecting to said pump chamber to supply fluid thereto, pump outlet means being provided in said enclosure and connecting to said pump chamber for transmitting liquid under pump outlet pressure therefrom, a pressure actuated member connected to said pump outlet means for receiving operating pressures therefrom to be controlled thereby, and circuit means connecting said pressure actuated member in circuit with said auxiliary winding to control energization of said auxiliary winding dependent upon the speed of operation of said motor.

References Cited in the file of this patent

UNITED STATES PATENTS

| | | |
|---|---|---|
| 1,976,151 | Thaheld | Oct. 9, 1934 |
| 2,249,843 | Marsland | July 22, 1941 |
| 2,307,113 | Daiger | Jan. 5, 1943 |
| 2,507,399 | Christensen | May 9, 1950 |
| 2,862,076 | Bonner | Nov. 25, 1958 |